United States Patent
Cho

(10) Patent No.: US 7,298,732 B2
(45) Date of Patent: Nov. 20, 2007

(54) METHOD FOR INITIALIZING INTERNET PROTOCOL PHONE IN INTERNET PROTOCOL TELEPHONY SYSTEM

(75) Inventor: Jun-Woo Cho, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1026 days.

(21) Appl. No.: 10/354,978

(22) Filed: Jan. 31, 2003

(65) Prior Publication Data

US 2003/0156579 A1    Aug. 21, 2003

(30) Foreign Application Priority Data

Feb. 19, 2002    (KR) ................. 2002-8716

(51) Int. Cl.
*H04L 12/66*    (2006.01)
(52) U.S. Cl. ...................... 370/352; 370/356
(58) Field of Classification Search ........... 370/352, 370/356; 379/900
See application file for complete search history.

(56) References Cited

U.S. PATENT DOCUMENTS

| | | | |
|---|---|---|---|
| 6,400,950 B1 * | 6/2002 | Patel et al. | 455/435.1 |
| 6,427,170 B1 | 7/2002 | Sitaraman et al. | |
| 6,661,785 B1 * | 12/2003 | Zhang et al. | 370/352 |
| 6,791,970 B1 * | 9/2004 | Ng et al. | 370/352 |
| 7,023,838 B1 * | 4/2006 | Hahn et al. | 370/352 |
| 7,031,279 B2 * | 4/2006 | Lee et al. | 370/331 |
| 7,046,659 B1 * | 5/2006 | Woundy | 370/352 |
| 2002/0046263 A1 | 4/2002 | Camerini et al. | |

FOREIGN PATENT DOCUMENTS

WO    WO 01/95063 A2    12/2001
WO    WO 02/082794 A2    10/2002

OTHER PUBLICATIONS

"Search Report under Section 17" issued by U.K. Patent Office dated on May 22, 2003.

* cited by examiner

*Primary Examiner*—Ahmad F. Matar
*Assistant Examiner*—Aamir Haq
(74) *Attorney, Agent, or Firm*—Robert E. Bushnell, Esq.

(57) ABSTRACT

A method for initializing an IP phone in an IP telephony system. The IP (Internet Protocol) telephony system includes an IP network; at least one gatekeeper connected to the IP network, having a DHCP (Dynamic Host Configuration Protocol) server and a TFTP (Trivial File Transfer Protocol) server; an IP phone connected to the gatekeeper for voice communication service; and an AAA (Authentication, Authorization and Account) server. The method allowing the IP phone to access the DHCP server via a DHCP server IP address, and allocating a terminal IP address and a TFTP server IP address to the IP phone; allocating subscriber information having a phone number and an IP address of the gatekeeper to the IP phone to allow the IP phone to access the gatekeeper and transmit a registration request signal to the gatekeeper; the gatekeeper informing the AAA server of subscriber information of the IP phone.

20 Claims, 4 Drawing Sheets

METHOD FOR INITIALIZING INTERNET PROTOCOL PHONE IN INTERNET PROTOCOL TELEPHONY SYSTEM

CLAIM OF PRIORITY

This application makes reference to, incorporates the same herein, and claims all benefits accruing under 35 U.S.C §119 from an application entitled METHOD FOR INITIALIZING INTERNET PROTOCOL PHONE IN INTERNET PROTOCOL TELEPHONY SYSTEM earlier filed in the Korean Industrial Property Office on 19 Feb. 2002, and there duly assigned Serial No. 2002-8716 by that Office.

BACKGROUND OF THE INVENTION

1. Field of the Invention

The present invention relates to an Internet protocol (IP) telephony system, and more particularly to a method for initializing an Internet protocol (IP) terminal.

2. Description of the Related Art

Firstly, prior to the explanation of the preferred embodiment of the present invention, the abbreviations and technical terms are defined as follows:

| | |
|---|---|
| G/K: | Gatekeeper |
| IP: | Internet Protocol |
| VoIP: | Voice over IP |
| TFTP: | Trivial File Transfer Protocol |
| DHCP: | Dynamic Host Configuration Protocol |
| AAA: | Authentication, Authorization and Account |
| MCU: | Multi-point Control Unit |
| RRG: | Registration Request |
| RCF: | Registration Confirmation |
| RAS: | Registration/Admission/Status (Registration and Admission Control Signaling) |
| RRJ: | Registration Rejection |

In recent times, following the current trend of rapidly growing Internet technology, an IP-based network or a packet-based network (hereinafter referred to as "IP network") is developing rapidly not only in the Internet performance aspect but also in the Internet service aspect. For instance, the IP network is typically implemented in consideration of data transmission, but currently needs to be implemented in consideration of voice transmission as well as the data transmission.

According to demand for data and voice transmission at the same time, the IP network has been developed in the form of a multimedia service by which not only voice transmission, like a typical network, but also video and data transmission are possible. The IP network is called "VoIP (Voice over IP) system" or "Internet Protocol Telephony System" in that it makes it possible to perform voice communication between many subscribers by transmitting voice signals to them. Likewise, besides the data transmission, the voice transmission over the IP network is very important in the IP network. Under this condition, many developers are intensively conducting research into a voice transmission method in the IP network.

For example, a multimedia communication standard H.323 protocol recommended by ITU-T (International Telecommunication Union—Telecommunication) provides fundamental principles for voice, video, and data communications over the IP network including the Internet. One of the H.323 entities defined in the H.323 protocol is a gatekeeper. The gatekeeper binds H.323 endpoints present in a packet-based network (i.e., an IP-based network) in one control zone defined as a "Zone", and then controls/manages the bound H.323 endpoints. For instance, there are a variety of H.323 endpoints such as a gateway, a terminal, and a MCU (Multi-point Control Unit). One gatekeeper is present in the zone, and is composed of at least one H.323 endpoint. A plurality of gatekeepers are collected to form a multi-zone, and other gatekeepers for controlling the multi-zone may exist.

The gatekeeper has various kinds of principal functions such as an address translation function, a call admission function, a bandwidth control function, a call control function, and a maintenance function. The address translation function translates an alias name or a destination number into a network address (i.e., an IP address). The call admission function means a function by a RAS (Registration/Admission/Status) protocol generically naming protocols related to a gatekeeper in the H.323 standards. The bandwidth control function distributes a limited bandwidth of a network into a plurality of endpoints, and performs a blocking function by checking whether the bandwidth reaches a threshold value or not. The call control function makes a call connection/disconnection between endpoints through the medium of a gatekeeper. The maintenance function means a supplementary function such as accounting or statistics.

One of the basic signaling protocols of the gatekeeper is the RAS. The RAS is a protocol for implementing a basic interface between endpoints (e.g., a terminal, gateway, and MCU, etc.) and a gatekeeper. In the RAS, the gatekeeper is a server, and the endpoints are clients. Namely, the RAS is a basic protocol necessary for the gatekeeper functioning as the server to manage/control/monitor the endpoints functioning as clients, in such a way that the gatekeeper can reflect the RAS results in its own operation and control procedure. The registration mode in the RAS means that the endpoint (client) registers its own presence to the gatekeeper (server).

An admission mode in the RAS determines whether the endpoint follows the rules of H.323 and a corresponding zone in the gatekeeper, and permits access to a VoIP network upon receiving the result signal. Herein, the rule of H.323 determines whether an alias name being a registration ID (Identification) of the endpoint is equal to that of another endpoint. The rule of the corresponding zone determines whether a corresponding endpoint is registered to the gatekeeper.

In the status mode of the RAS, the endpoint periodically informs the gatekeeper of its own information and current status in such a way that the gatekeeper acquires information needed to operate/control the endpoint, thereby making a periodic link test between a server and a client.

As stated above, a communication interface between an IP terminal (i.e., IP-phone) and a gatekeeper in the VoIP system or the IP telephony system is performed according to the RAS protocol functioning as a H.323 protocol being one of ITU-T standards. However, the communication interface between the IP phone and the gatekeeper according to the RAS protocol has the following problems, resulting in user's inconvenience in operation.

Firstly, a user must manually input initialization information (e.g., a server IP address, and H.323 ID, etc.) in initializing the IP phone and the gatekeeper.

Secondly, a signal mismatch occurs in performing a link restart between the IP phone and the gatekeeper, resulting in user's inconvenience in operation.

SUMMARY OF THE INVENTION

Therefore, the present invention has been made in view of the above problems, and it is an object of the present invention to provide a method for controlling an IP phone by a gatekeeper in case of initializing an IP phone and a gatekeeper in a VoIP system.

It is another object of the present invention to provide a method for matching an IP phone with a gatekeeper in case of restarting the IP phone in a VoIP system.

It is yet another object of the present invention to provide a method for matching an IP phone with a gatekeeper in case of restarting the gatekeeper in a VoIP system.

It is yet another object of the present invention to provide a method for simplifying information input procedures of a user in case of initializing an IP phone and a gatekeeper in a VoIP system.

In accordance with one aspect of the present invention, the above and other objects can be accomplished by the provision of an IP (Internet Protocol) telephony system including an IP network; at least one gatekeeper connected to the IP network, having a DHCP (Dynamic Host Configuration Protocol) server and a TFTP (Trivial File Transfer Protocol) server; an IP phone connected to the gatekeeper for voice communication service; and an AAA (Authentication, Authorization and Account) server for performing an authentication, authorization, and accounting of the IP phone, wherein a method for initializing the IP phone comprises the steps of a) allowing the IP phone to access the DHCP server via a DHCP server IP address received from a user when the IP phone restarts, and allocating a terminal IP address and a TFTP server IP address to the IP phone; b) allowing the IP phone to access the TFTP server via the TFTP server IP address, and allocating subscriber information having a phone number and an IP address of the gatekeeper to the IP phone; c) allowing the IP phone to access the gatekeeper via the IP address of the gatekeeper, and transmitting a registration request signal to the gatekeeper; and d) allowing the gatekeeper to inform the AAA server of subscriber information of the IP phone.

In accordance with another aspect of the present invention, there is provided a method for initializing an IP phone, comprising the steps of a) allowing a gatekeeper to transmit a restart message to the IP phone when the gatekeeper restarts; b) allowing the IP phone to access a DHCP server via a DHCP server IP address received from a user upon receiving the restart message, and allocating a terminal IP address and a TFTP server IP address to the IP phone; c) allowing the IP phone to access the TFTP server via the TFTP server IP address, and allocating subscriber information having a phone number and an IP address of the gatekeeper to the IP phone; d) allowing the IP phone to access the gatekeeper via the IP address of the gatekeeper, and transmitting a registration request signal to the gatekeeper; and e) allowing the gatekeeper to inform the AAA server of subscriber information of the IP phone.

In accordance with yet another aspect of the present invention, there is provided a method for initializing an IP phone, comprising the steps of a) allowing the IP phone to access a DHCP server via a DHCP server IP address received from a user, and allocating a terminal IP address and a TFTP server IP address to the IP phone; b) allowing the IP phone to access a TFTP server via the TFTP server IP address, and allocating subscriber information having a phone number and an IP address of a gatekeeper to the IP phone; c) allowing the IP phone to access the gatekeeper via the IP address of the gatekeeper, and transmitting a registration request signal to the gatekeeper; d) determining whether initialization of the gatekeeper is completed in case of transmitting the registration request signal to the gatekeeper; e) if the initialization of the gatekeeper is not completed, repeatedly performing the steps (a) to (d); and f) if the initialization of the gatekeeper is completed, allowing the gatekeeper to inform the AAA server of subscriber information of the IP phone.

The foregoing embodiments of the present invention are briefly disclosed to be readily understood by those skilled in the art. Although the present invention has been described with respect to specific embodiments, various changes and modifications will be apparent to those skilled in the art. The following embodiments are given by way of example. The present invention is not limited to these embodiments, but encompasses all variants falling within the scope of the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
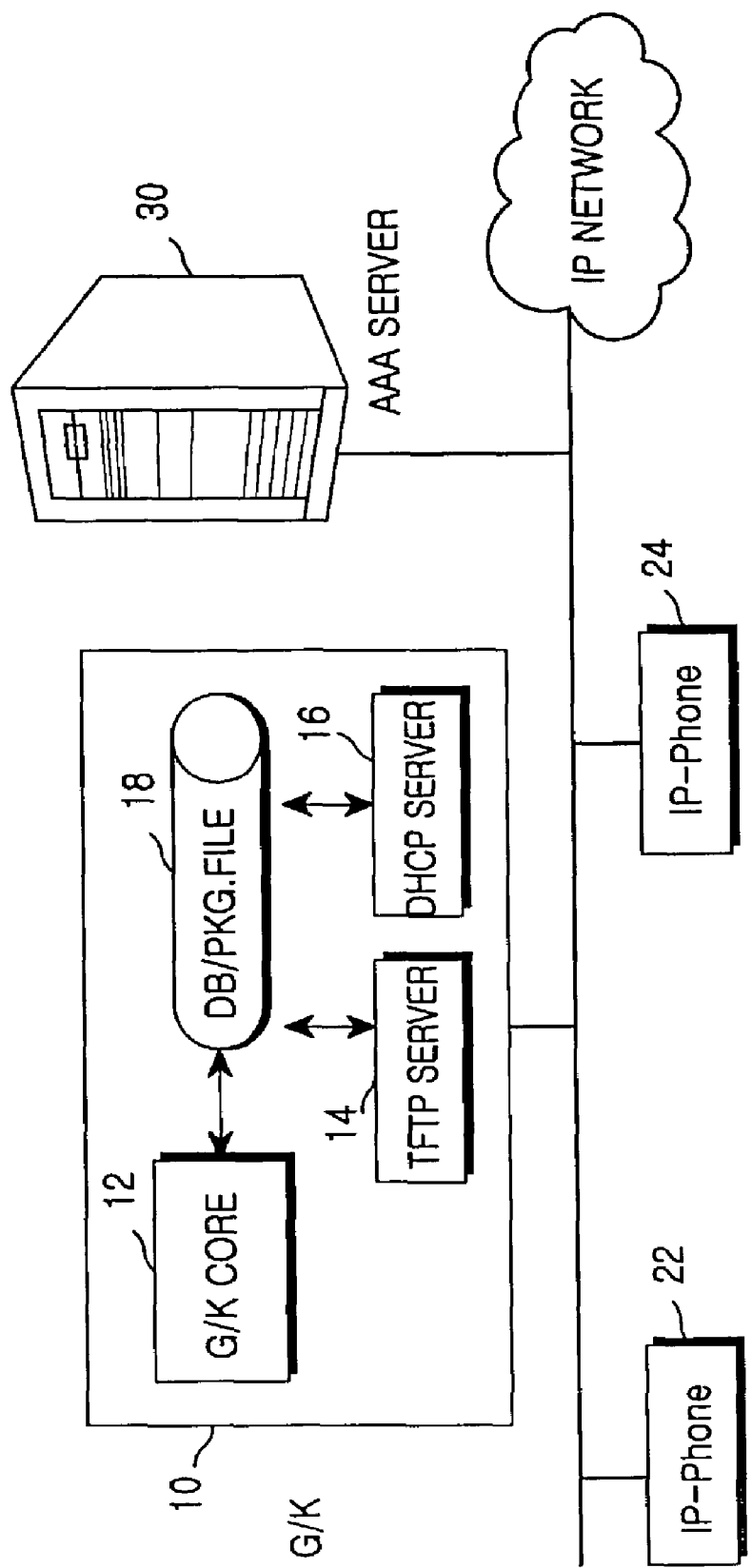
FIG. 1 is a view illustrating a block diagram of an IP (Internet protocol) telephony system in accordance with the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a view illustrating a block diagram of an IP telephony system in accordance with the present invention. The IP telephony system shown in FIG. 1 is a VoIP system for performing voice transmission over an IP network. As well known in the art, a VoIP system generally comprises a plurality of gatekeepers. The VoIP system according to the present invention, however, is composed only of a gatekeeper positioned in a predetermined service zone and IP phones connected to the gatekeeper.

Referring to FIG. 1, the IP telephony system includes a gatekeeper (G/K) 10, a plurality of IP phones (i.e., IP terminals) 22 and 24, and an AAA (Authentication, Authorization and Account) server 30. These components are connected to an IP network.

The gatekeeper 10 includes a G/K (gatekeeper) core 12, a TFTP (Trivial File Transfer Protocol) server 14, a DHCP (Dynamic Host Configuration Protocol) server 16 and a storage unit 18.

The IP phones 22 and 24 are connected to the gatekeeper 10 to perform a voice communication service over the IP network. The IP phones 22 and 24 are connected to the DHCP server 16 of the gatekeeper 10, and are assigned their own IP addresses and a TFTP server IP address from the DHCP server. Also, the IP phones 22 and 24 are connected to the TFTP server 14, and are assigned a phone number (H.323 ID (Tel #)) being subscriber information and a gatekeeper IP address from the TFTP server 14. Further, the IP phones 22 and 24 receive software version information regarding their own execution files (i.e., .exe files). In the case where the received software version information is different from prior software version information concerning the execution files of the IP phones 22 and 24, the IP phones 22 and 24 download a new execution file from the gatekeeper 10.

The G/K core 12 controls an overall operation accompanied by the gatekeeper 10. The storage unit 18 includes a database (DB) for storing information of a plurality of IP phones generating registration request (RRQ) signals, and also stores a package file therein. As for the package file, the gatekeeper 10 downloads the package file along with subscriber information of the terminals (IP-phones) from the AAA server 30. In this case, the subscriber information indicates information stored in the DB of the storage unit 18 and is, for example, a phone number (H.323 ID (Tel #)) and an IP address.

In case of using the DHCP server 16, the IP address is useless. There are software version information and execution files of IP phones in the package file. The DHCP server 16 allocates an IP address and an IP address of the TFTP server 14 to an IP phone accessed thereto.

The TFTP server 14 allocates a phone number (H.323 ID (Tel #)) being subscriber information and a gatekeeper IP address to an IP phone accessed thereto. In the case where software version information concerning an execution file of an IP phone is different from another software version information concerning an execution file stored in the storage unit 18, a corresponding IP phone transmits a request signal to the TFTP server 14, and the TFTP server 14 provides the corresponding IP phone with an execution file stored in the storage unit 18.

The G/K core 12, TFTP server 14, DHCP server 16, and storage unit 18 contained in the gatekeeper 10 are interconnected to make an IPC (Inter-Processor Communication) possible. The AAA server 30 authenticates the IP phones 22 and 24, authorize that the IP phones 22 and 24 to allow the IP phones 22 and 24 to gain access to the IP network, and performs an accounting operation after the IP phones 22 and 25 access the IP network.

As previously described, the IP phones 22 and 24 access the gatekeeper 10 according to a RAS (Remote Access Service (dial-up network access)) protocol and are then initialized, thereby the registration, admission and status modes contained in the RAS protocol are performed.

During the initialization operation, users of the IP phones 22 and 24 manually input only an IP address of the DHCP server 16 without any other manipulation, increasing the user's convenience. For reference, in case of a typical initialization step using the RAS protocol of H.323 standards, the user always has to manually input all information needed for the initialization of an IP phone, resulting in a user's inconvenience. But, the present invention obviates this problem in that it requires just one IP address input process.

If the gatekeeper 10 or one of the IP phones 22 and 24 restarts, an initialization operation is performed again. Likewise, in the case where either the gatekeeper 10 or the IP phone performs such restarting operation, a signal mismatch occurs between the gatekeeper 10 and the IP phone 22 or 24. This mismatch part can be removed by the following operations shown in FIGS. 2-4.

In the following description, an initialization operation between the gatekeeper 10 and the IP phone 22 will be described by way of example. But, it should be noted that an initialization operation between the gatekeeper 10 and the IP phone 24 is the same.

Figure 2:
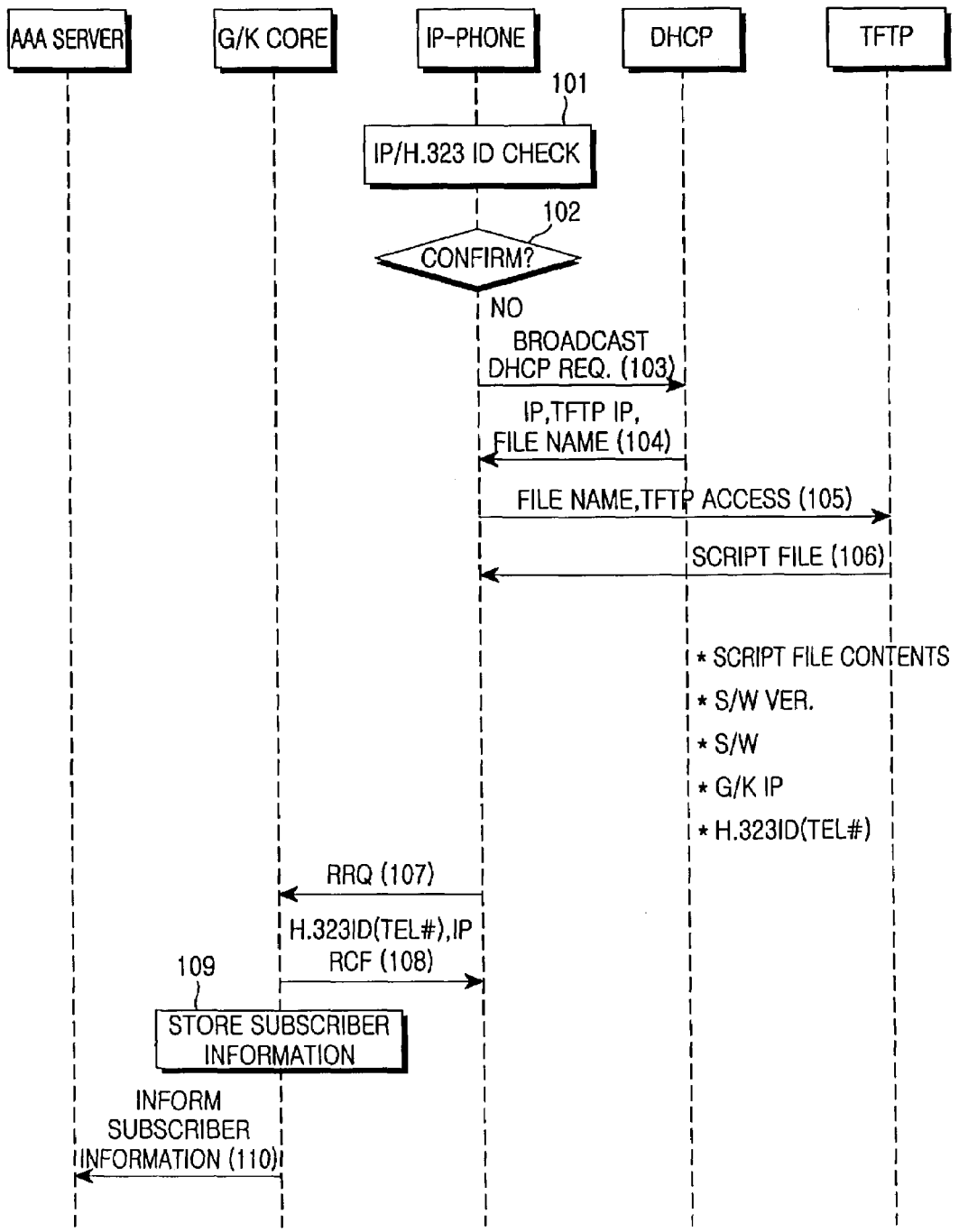
FIG. 2 is a view illustrating a signal flow among internal components shown in FIG. 1 in case of initializing an IP phone in accordance with a preferred embodiment of the present invention.

FIG. 2 is a view illustrating a signal flow among internal components shown in FIG. 1 when initializing an IP phone in accordance with a first preferred embodiment of the present invention. The signal flow shown in FIG. 2 is followed in the case where the IP phone 22 and the gatekeeper 10 simultaneously restart or only IP phone 22 restarts.

Referring to FIG. 2, the IP phone 22 determines at step 101 whether its own IP and phone number (H.323 ID) are detected. If the IP phone 22 does not detect its own IP and phone number (H.323 ID) at step 102, it gains access to the DHCP server 16 at step 103 and then broadcasts a DHCP server request message to the DHCP server 16. When connecting the IP phone 22 to the DHCP server 16 over an IP network, an IP address of the DHCP server 16 is directly input by a user.

Upon receiving the DHCP server request message, the DHCP server 16 performs an IP address allocation of the IP phone 22, an IP address allocation of a TFTP server 14, and a file name allocation at step 104, and then transmits the allocated results to the IP phone 22. Herein, the file name indicates a name of a software file to be transmitted from the TFTP server 14 to the IP phone 22. Then, the IP phone 22 is connected to the TFTP server 14 via the allocated IP address of the TFTP server 14 at step 105.

If the TFTP server 14 is connected to the IP phone 22 at step 105, then TFTP server 14 transmits a script file to the IP phone 22 at step 106. Herein, the script file includes script file contents, a gatekeeper (G/K) IP address, a phone number (H.323 ID (Tel #)), and a software version (S/W VER.) of an execution file of the IP phone 22. At this time, in the case where a software version of an execution file of the IP phone 22 is different from a software version of a gatekeeper 110, corresponding software (S/W), that is, a corresponding execution file is downloaded from the TFTP server 14 to the IP phone 22 at step 106.

The determination of the software version difference is provided after software version information is transmitted to the IP phone 22. In other words, after the software version information transmitted to the IP phone 22 at step 106, the IP phone 22 determines whether the received software version information is equal to a software version of a gatekeeper 10.

Thereafter, the IP phone 22 requests corresponding software from the TFTP server 14, and then downloads the corresponding software from the TFTP server 14 responsive to the request signal. Note that the aforementioned operations after step 105 are all contained in the step 106.

In order to allocate the phone number (H.323 ID (Tel #)) and the gatekeeper (G/K) IP at step 106, the TFTP server 14 has a function for receiving the phone number (H.323 ID (Tel #)) and the gatekeeper (G/K) IP to be allocated from a database (DB) of the storage unit 18. Also, the TFTP server 14 has another function of preventing the phone number (H.323 ID (Tel #)) from overlapping with another phone number during the allocation step at step 106.

Then, at step 107, the IP phone 22 receives the script file provided at step 106, is connected to gatekeeper (G/K) core 12 by adapting the allocated gatekeeper (G/K) IP, and transmits a RRQ (Registration Request) message to the gatekeeper (G/K) core 12 so as to request registration in the gatekeeper (G/K) core 12.

At this time, the IP phone 22 uses its own allocated H.323 ID and IP. Upon receiving the RRQ message, the gatekeeper (G/K) core 12 transmits a RCF (Registration Confirmation) message used for authorizing a registration to the IP phone 22 at step 108. Thereafter, at step 109, the gatekeeper (G/K) core 12 stores information (i.e., subscriber information) concerning the IP phone 22 in the DB of storage unit 18, and informs the AAA server 30 of the aforesaid storage status in such a way that synchronization between the gatekeeper 10 and the AAA server 30 in association with subscriber information of the IP phone 22 can be maintained.

In the meantime, a user of the IP phone 22 may want to use another phone number other than the initial allocated phone number H.323 ID. In this case, the user needs to change only a current phone number to a desired phone number on his or her IP phone. But, under this condition, if the desired phone number is in use by someone else, then the gatekeeper 10 generates an alarm signal indicating occupancy of the desired phone number, and transmits the alarm signal to a corresponding terminal. In this case, a system manager (or operator) needs to directly change a current phone number to another phone number in the AAA server 30.

Figure 3:
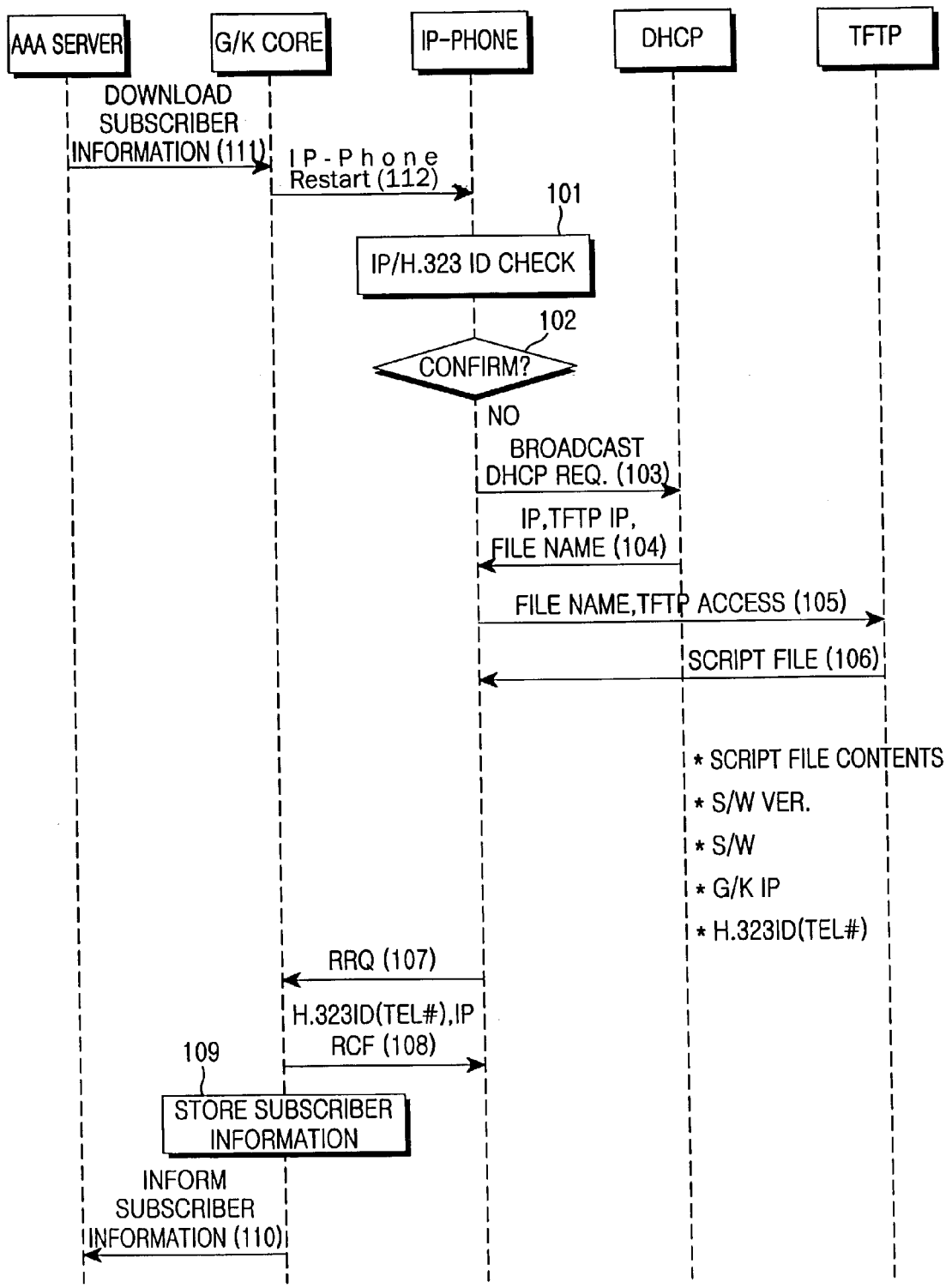
FIG. 3 is a view illustrating a signal flow among internal components shown in FIG. 1 in case of initializing an IP phone in accordance with another preferred embodiment of the present invention.

FIG. 3 is a view illustrating a signal flow among internal components shown in FIG. 1 when initializing an IP phone in accordance with a second preferred embodiment of the present invention. The signal flow shown in FIG. 3 is made in the case where a phone number of an IP phone 22 is changed to another phone number or a gatekeeper 10 restarts.

Referring to FIG. 3, an AAA server 30 transmits subscriber information (H.323 ID and IP) to gatekeeper (G/K) core 12 at step 111. As previously stated, this operation at step 111 is performed in the case where a phone number of the IP phone 22 is changed to another phone number or the gatekeeper 10 restarts. Upon receiving the subscriber information from the AAA server 30, the gatekeeper (G/K) core 12 transmits an "IP-Phone Restart" message functioning as a restart message to the IP phone 22 at step 112. Transmitting the "IP-Phone Restart" message prevents a service from being delayed.

The reason for the service delay is that the IP phone 22 cannot transmit a registration request signal to the gatekeeper 10 or transmits the registration request signal to the gatekeeper 10 late under the condition that only the gatekeeper 10 restarts or a phone number of the IP phone 22 is changed to another phone number. Therefore, in case of restarting the gatekeeper 10 or changing the IP phone 22's phone number functioning as a key value for a system operation, it is necessary for the gatekeeper 10 to directly restart a corresponding IP phone 22 to achieve a registration.

After the steps 111 and 112, the aforesaid steps 101~110 shown in FIG. 2 are performed. That is, besides steps 111 and 112, a signal flow shown in FIG. 3 is identical with that in FIG. 2.

Figure 4:
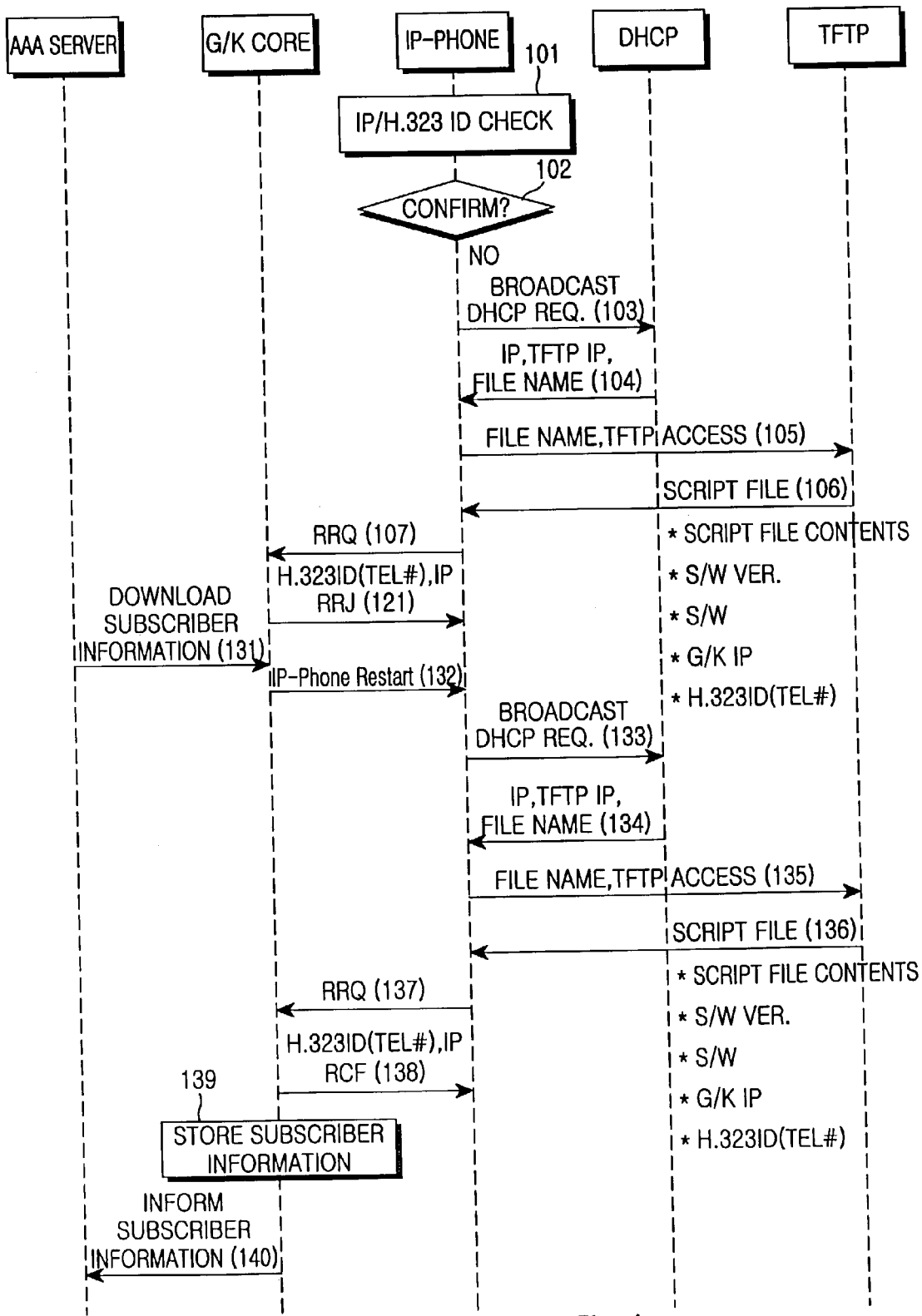
FIG. 4 is a view illustrating a signal flow among internal components shown in FIG. 1 in case of initializing an IP phone in accordance with yet another preferred embodiment of the present invention.

FIG. 4 is a view illustrating a signal flow among internal components shown in FIG. 1, when initializing an IP phone in accordance with a third preferred embodiment of the present invention. The signal flow shown in FIG. 4 is followed in the case where a registration request signal of an IP phone 22 is rejected by a gatekeeper (G/K) core 12 after the IP phone 22 transmits the registration request signal to the gatekeeper (G/K) core 12. For example, in the case where subscriber information downloading from an AAA server 30 to the gatekeeper (G/K) core 12 is not completed or the gatekeeper 10's initialization is not completed even though the IP phone 22 transmits the registration request signal to the gatekeeper (G/K) core 12, the gatekeeper (G/K) core 12 rejects the registration request signal of the IP phone 22.

Referring to FIG. 4, steps 101~107 shown in FIG. 4 are identical with steps 101~107 shown in FIG. 2. Accordingly, the IP phone 22 transmits a registration request signal to the gatekeeper (G/K) core 12 at step 107.

The gatekeeper (G/K) core 12 rejects the registration request signal at step 121. In this case, if subscriber information downloading from an AAA server 30 to the gatekeeper (G/K) core 12 is not completed, the gatekeeper (G/K) core 12 provides the IP phone 22 with a RRJ (Registration Rejection) message at step 121.

After step 121, if subscriber information downloading from the AAA server 30 to the gatekeeper (G/K) core 12 is completed at step 131, the gatekeeper (G/K) core 12 transmits an "IP-Phone Restart" message to the IP phone 22 at step 132. Following step 132, steps 133~137, identical with the aforesaid steps 103~107 of FIG. 4, are performed.

The steps 133~137, are repeatedly performed in the case where the initialization of the gatekeeper (G/K) core 12 is not completed, because the gatekeeper (G/K) core 12 provides the IP phone 22 with a RRJ (Registration Rejection) message in response to the RRQ message until the initialization of the gatekeeper (G/K) core 12 is not completed, not shown. On the contrary, in the case where the initialization of the gatekeeper (G/K) core 12 is completed, as shown, subscriber information registration procedures such as steps 138~140 are performed.

As apparent from the above description, the present invention effectively controls an IP phone by a gatekeeper in a VoIP system (i.e., IP telephony system). The present invention has an advantage in that it removes a user's inconvenience by adapting a play&plug method in initializing the IP-phone and the gatekeeper. Therefore, a user needs not manually input all of the initialization information (e.g., a server IP address or a H.323 ID, etc.) in initializing the IP-phone and the gatekeeper. In brief, a user needs to designate only a DHCP server IP on his or her IP-phone in initializing the IP-phone and the gatekeeper. Furthermore, the present invention removes a signal mismatch part (e.g., subscriber information) occurring in performing a link restart between the IP phone and the gatekeeper, thereby maintaining accurate synchronization between a server and a client.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for initializing an IP (Internet Protocol) phone in an IP telephony system including an IP network; at least one gatekeeper connected to the IP network, the gatekeeper having a DHCP (Dynamic Host Configuration Protocol) server and a TFTP (Trivial File Transfer Protocol) server; the IP phone connected to the gatekeeper for voice communication service; and an AAA (Authentication, Authorization and Account) server for performing an authentication, authorization, and accounting of the IP phone, the method for initializing the IP phone comprising steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone;

allowing the IP phone to access the gatekeeper via the IP address of the gatekeeper, the IP phone transmitting a registration request signal to the gatekeeper; and allowing the gatekeeper to inform the AAA server of the subscriber information of the IP phone.

2. The method as set forth in claim 1, further comprising a step of:

allowing the IP phone connected to the TFTP server to receive software version information concerning an execution file of the IP phone from the TFTP server.

3. The method as set forth in claim 2, further comprising a step of:

if the received software version information concerning said execution file of the IP phone is different from stored software version information concerning said execution file of the IP phone stored in the gatekeeper, downloading to the IP phone a new execution file, corresponding to the stored software version information, from the TFTP server.

4. The method as set forth in claim 1, further comprising a step of:

allowing the gatekeeper to transmit a restart message to the IP phone to restart the IP phone when the gatekeeper restarts.

5. The method as set forth in claim 1, further comprising steps of:

transmitting subscriber information from the AAA server to the gatekeeper when the telephone number of the IP phone is changed; and allowing the gatekeeper to transmit a restart message to the IP phone to restart the IP phone.

6. The method as set forth in claim 1, further comprising steps of:

transmitting subscriber information from the AAA server to the gatekeeper when the gatekeeper restarts; and allowing the gatekeeper to transmit a restart message to the IP phone to restart the IP phone.

7. The method as set forth in claim 1, further comprising steps of:

transmitting a registration rejection signal from the gatekeeper to the IP phone in response to the registration request signal when it is determined that subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit a restart message to the IP phone to restart the IP phone when it is determined that subscriber information is completely downloaded from the AAA server to the gatekeeper.

8. The method as set forth in claim 5, further comprising steps of:

transmitting a registration rejection signal from the gatekeeper to the IP phone in response to the registration request signal when it is determined that said subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit said restart message to the IP phone to restart the IP phone when it is determined that subscriber information is completely downloaded from the AAA server to the gatekeeper.

9. The method as set forth in claim 6, further comprising steps of:

transmitting a registration rejection signal from the gatekeeper to the IP phone in response to the registration request signal when it is determined that said subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit said restart message to the IP phone to restart the IP phone when it is determined that subscriber information is completely downloaded from the AAA server to the gatekeeper.

10. A method for initializing an IP (Internet Protocol) phone in an IP telephony system including an IP network; at least one gatekeeper connected to the IP network, the gatekeeper having a DHCP (Dynamic Host Configuration Protocol) server and a TFTP (Trivial File Transfer Protocol) server; the IP phone connected to the gatekeeper for voice communication service; and an AAA (Authentication, Authorization and Account) server for performing an authentication, authorization, and accounting of the IP phone, the method for initializing the IP phone comprising steps of:

allowing the gatekeeper to transmit a restart message to the IP phone when the gatekeeper restarts;

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone;

allowing the IP phone to access the gatekeeper via the IP address of the gatekeeper, the IP phone transmitting a registration request signal to the gatekeeper; and allowing the gatekeeper to inform the AAA server of the subscriber information of the IP phone.

11. The method as set forth in claim 10, further comprising a step of:

allowing the IP phone connected to the TFTP server to receive software version information concerning an execution file of the IP phone from the TFTP server.

12. The method as set forth in claim 11, further comprising a step of:

if the received software version information concerning said execution file of the IP phone is different from stored software version information concerning said execution file of the IP phone stored in the gatekeeper, downloading to the IP phone a new execution file, corresponding to the stored software version information, from the TFTP server.

13. The method as set forth in claim 10, further comprising steps of:

transmitting a registration rejection signal from the gatekeeper to the IP phone in response to the registration request signal when it is determined that subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit a restart message to the IP phone to restart the IP phone when it is determined that subscriber information is completely downloaded from the AAA server to the gatekeeper.

14. A method for initializing an IP (Internet Protocol) phone in an IP telephony system including an IP network; at least one gatekeeper connected to the IP network, the gatekeeper having a DHCP (Dynamic Host Configuration Protocol) server and a TFTP (Trivial File Transfer Protocol) server; the IP phone connected to the gatekeeper for voice communication service; and an AAA (Authentication, Authorization and Account) server for performing an authentication, authorization, and accounting of the IP phone, the method for initializing the IP phone comprising steps of:

transmitting subscriber information from the AAA server to the gatekeeper when the telephone number of the IP phone is changed and allowing the gatekeeper to transmit a restart message to the IP phone allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone;

allowing the IP phone to access the gatekeeper via the IP address of the gatekeeper, the IP phone transmitting a registration request signal to the gatekeeper; and allowing the gatekeeper to inform the AAA server of the subscriber information of the IP phone.

15. The method as set forth in claim 14, further comprising a step of:

allowing the IP phone connected to the TFTP server to receive software version information concerning an execution file of the IP phone from the TFTP server.

16. The method as set forth in claim 15, further comprising a step of:

if the received software version information concerning said execution file of the IP phone is different from stored software version information concerning said execution file of the IP phone stored in the gatekeeper, downloading to the IP phone a new execution file, corresponding to the stored software version information, from the TFTP server.

17. The method as set forth in claim 14, further comprising steps of:

transmitting a registration rejection signal from the gatekeeper to the IP phone in response to the registration request signal when it is determined that said subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit said restart message to the IP phone to restart the IP phone when it is determined that subscriber information is completely downloaded from the AAA server to the gatekeeper.

18. The method as set forth in claim 16, further comprising steps of:

transmitting a registration rejection signal from the gatekeeper to the IP phone in response to the registration request signal when it is determined that said subscriber information is not completely downloaded from the AAA server to the gatekeeper;

repeating, until it is determined that subscriber information is completely downloaded from the AAA server to the gatekeeper, said steps of:

allowing the IP phone to access the DHCP server via a DHCP server IP address received from a user when the IP phone restarts and the IP phone does not detect its own terminal IP address and phone number, the DHCP server allocating a terminal IP address and a TFTP server IP address to the IP phone;

allowing the IP phone to access the TFTP server via the TFTP server IP address, the TFTP server allocating subscriber information having a phone number of the IP phone and an IP address of the gatekeeper to the IP phone; and allowing the IP phone to access the gatekeeper via the IP address of the gatekeeper, the IP phone transmitting a registration request signal to the gatekeeper; and allowing the gatekeeper to transmit said restart message to the IP phone to restart the IP phone when it is determined that subscriber information is completely downloaded from the AAA server to the gatekeeper.

19. An IP (Internet Protocol) telephony system comprising an IP network;

at least one gatekeeper connected to the IP network, the gatekeeper having a DHCP (Dynamic Host Configuration Protocol) server and a TFTP (Trivial File Transfer Protocol) server;

an IP phone connected to the gatekeeper for voice communication service; and an AAA (Authentication, Authorization and Account) server for performing an authentication, authorization, and accounting of the IP phone;

said IP phone accessing the DHCP server in response to a DHCP server IP address input by a user of the IP phone when the IP phone restarts and the IP phone does not detect its own terminal IP address and phone number;

said DHCP server allocating a terminal IP address and a TFTP server IP address to the IP phone when said IP phone accesses the DHCP server in response to the DHCP server IP address input by the user;

said IP phone accessing the TFTP server in response to the TFTP server IP address;

said TFTP server allocating subscriber information having a phone number of the IP phone and an IP address of the gatekeeper to the IP phone when said IP phone accesses the TFTP server;

said IP phone accessing the gatekeeper in response to the IP address of the gatekeeper, the IP phone transmitting a registration request signal to the gatekeeper; and said gatekeeper informing the AAA server of the subscriber information of the IP phone.

20. The IP (Internet Protocol) telephony system as set in claim 19, said gatekeeper comprising:

a gatekeeper core controlling overall operation of the gatekeeper; and a storage unit including a database storing information of a plurality of IP (Internet Protocol) phones generating registration request signals and storing package files containing subscriber information of the plurality of IP phones.

* * * * *